US012459610B2

(12) United States Patent
Dupuis et al.

(10) Patent No.: US 12,459,610 B2
(45) Date of Patent: Nov. 4, 2025

(54) MODULAR SEATING SYSTEM AND CHAIRS FOR SELECTIVELY CONNECTING TO A SURFACE

(71) Applicant: BOMBARDIER RECREATIONAL PRODUCTS INC., Valcourt (CA)

(72) Inventors: Felix Dupuis, Windsor (CA); Philippe Marcoux, Sherbrooke (CA); Alexandre Lecointre, Orford (CA); Ghyslain Beland, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 415 days.

(21) Appl. No.: 18/068,864

(22) Filed: Dec. 20, 2022

(65) Prior Publication Data

US 2023/0202620 A1 Jun. 29, 2023

Related U.S. Application Data

(60) Provisional application No. 63/293,702, filed on Dec. 24, 2021.

(51) Int. Cl.
*B63B 29/06* (2006.01)
*B60N 2/015* (2006.01)
*B63B 29/04* (2006.01)

(52) U.S. Cl.
CPC .......... *B63B 29/06* (2013.01); *B60N 2/01541* (2013.01); *B63B 2029/043* (2013.01)

(58) Field of Classification Search
CPC .............. B63B 29/06; B63B 2029/043; B60N 2/01541
See application file for complete search history.

(56) References Cited

U.S. PATENT DOCUMENTS 11,634,195 B1 * 4/2023 Dupuis .............. B60N 2/01566 114/364
2021/0024177 A1 * 1/2021 Perkins .................. B63B 29/06
2023/0192246 A1 * 6/2023 Dupuis .................. B63B 1/121 114/363

FOREIGN PATENT DOCUMENTS

CN 115243954 A * 10/2022 ............... A47C 3/18
EP 3651618 B1 * 10/2022 ........... A47C 16/025

* cited by examiner

*Primary Examiner* — S. Joseph Morano
*Assistant Examiner* — Jovon E Hayes
(74) *Attorney, Agent, or Firm* — BCF LLP

(57) ABSTRACT

A modular seating system including a mounting surface having a plurality of attachment features formed therein and a plurality of chairs. Each chair of the plurality of chairs includes a base including a base body, an interior volume, two lateral openings formed in opposite lateral sides of the base body, the two lateral openings communicating with the interior volume, and a top opening communicating with the interior volume; a connector connected at least in part to a bottom side of the base body; and a seat portion connected to the base body and arranged: to provide a seating surface and to prevent access to the top opening when in the closed position, and to allow access to the top opening when in the open position, each attachment feature configured for receiving the connector of each chair of the plurality of chairs for selectively connecting each chair to the mounting surface.

21 Claims, 15 Drawing Sheets

MODULAR SEATING SYSTEM AND CHAIRS FOR SELECTIVELY CONNECTING TO A SURFACE

CROSS-REFERENCE TO RELATED APPLICATION

The present application claims priority to U.S. Provisional Patent Application No. 63/293,702, entitled "Modular Seating System and Chairs for Selectively Connecting to a Surface," filed Dec. 24, 2021, the entirety of which is incorporated herein by reference.

FIELD OF TECHNOLOGY

The present technology relates to a modular seating system, a modular seating assembly, and chairs for selectively mounting to a surface.

BACKGROUND

Many recreational watercraft such as small boats, pontoon boats, and the like are provided with accessories, such as chairs and tables, which are permanently installed on their decks. When a watercraft deck is sufficiently large, it is possible to add more accessories, for example additional chairs. Typically, a chair or other furniture may be permanently attached to the deck, this arrangement requiring piercing holes in the deck for installation of bolts or screws. In that case, subsequent changes to the configuration, for example moving a chair, will require significant work and leave unsightly holes on the surface of the deck.

Watercraft with permanently installed seating also often have the advantage of providing storage space therein, often extending along an interior of a row of seats. Use of additional chairs or accessories which are re-arrangeable on the deck, while increasing flexibility of seating arrangements on a watercraft, does not provide the large storage spaces often available in permanently installed seating arrangements.

In view of the foregoing, there is a desire for seating arrangements to address at least some of these inconveniences.

SUMMARY

It is an object of the present technology to ameliorate at least some of the inconveniences present in the prior art.

According to one aspect of the present technology, there is provided a modular seating system, including chairs and a mounting surface for selectively connecting the chairs thereto. The mounting surface, in the present embodiment, is a series of floor tiles for a deck of a watercraft, or for a dock in some cases. Each floor tile includes an attachment feature to which a chair can be selectively connected, specifically four arcuate slots formed therein. Each chair of the modular seating system includes a base with two lateral openings, each lateral opening providing access therethrough to an interior volume of the base. The interior volume, also accessible from a top side of the chair base when a seat portion is pivoted out of the way, can serve as a storage space. When two or more chairs are positioned side-by-side, the lateral opening align to form a larger storage space on an interior of the adjacent chair bases. The modular seating system also includes one or more side panels for closing a lateral opening on the end of a row of two or more chairs, in order to enclose the storage space. As such, objects disposed therein are only selectively accessible through the top openings, when the seat portions are in an open position.

According to an aspect of the present technology, there is provided a modular seating system including a mounting surface having a plurality of attachment features formed therein and a plurality of chairs. Each chair of the plurality of chairs includes a base including a base body, an interior volume formed by the base body, two lateral openings formed in opposite lateral sides of the base body, the two lateral openings communicating with the interior volume, each lateral opening occupying at least a majority of an area of a corresponding lateral side of the base body, and a top opening formed in a top side of the base body, the top opening communicating with the interior volume; a connector connected at least in part to a bottom side of the base body; and a seat portion connected to the top side of the base body, the seat portion being selectively moveable between at least an open position and a closed position, the seat portion being arranged: to provide a seating surface and to prevent access to the top opening when in the closed position, and to allow access to the top opening when in the open position, each of the plurality of attachment features being configured for receiving the connector of each chair of the plurality of chairs for selectively connecting each chair to the mounting surface.

In some embodiments, at least one of the plurality of chairs is a single-seat chair.

In some embodiments, the connector includes a locking portion configured for connecting to at least one attachment feature of the plurality of attachment features; and an actuating portion operatively connected to the locking portion, the actuating portion being accessible on a front side of the base body.

In some embodiments, at least one chair of the plurality of chairs further includes a backrest portion connected to and extending upwards from the base.

In some embodiments, at least one chair of the plurality of chairs further includes a corner backrest connected to the base of the at least one chair, the corner backrest extending upward from the base, at least a portion of the corner backrest being substantially perpendicular to the backrest portion of the chair.

In some embodiments, the system further includes at least one side panel configured to be selectively connected to the base body of at least one chair of the plurality of chairs, the at least one side panel closing one of the two lateral openings when connected to the base body of the at least one chair.

In some embodiments, the seat portion is selectively moveable between at least the open position and the closed position by pivoting about a pivot axis.

In some embodiments, the pivot axis is aligned with a front side of the base, a rear edge of the seat portion rotating upward and forward when the seat portion is pivoted from the closed position to the open position.

In some embodiments, the seat portion is selectively removable from the base.

In some embodiments, a front side of the base is closed by the base body such that the interior volume of the base is not accessible from the front side of the base.

In some embodiments, the base body defines a closed perimeter of each of the two lateral openings of the base body.

In some embodiments, for at least one chair of the plurality of chairs: the seat portion includes at least one curved protrusion extending downward and forward from a forward portion of a bottom surface of the seat portion; the base body includes at least one curved recess arranged to receive the at least one curved protrusion therein when the seat portion is in the closed position.

In some embodiments, for the at least one chair: the seat portion includes at least one post extending downward from a rear portion of the bottom side of the seat portion; the base includes at least one post opening defined by the base body; and when the seat portion is in the closed position, the at least one post is received and selectively held in the at least one post opening.

In some embodiments, for the at least one chair, the base further includes at least one rubber grommet disposed in the at least one opening, the at least one rubber grommet being configured to selectively maintain the at least one post in the at least one opening when the seat portion is in the closed position.

In some embodiments, the mounting surface is a deck of a watercraft.

In some embodiments, when a first chair of the plurality of chairs is connected to the mounting surface adjacent to a second chair of the plurality of chairs: a first lateral opening of the two lateral openings of the first chair is adjacent to a second lateral opening of the two lateral openings of the second chair; and a first interior volume of the first chair communicates with a second interior volume of the second chair through adjacently disposed first lateral opening and second lateral opening.

In some embodiments, for each chair of the plurality of chairs, lower edges of the lateral openings are substantially aligned with an internal lower surface of the base body, the internal lower surface defining a bottom of the interior volume; and when a first chair of the plurality of chairs is connected to the mounting surface adjacent to a second chair of the plurality of chairs: a first interior volume of the first chair communicates with a second interior volume of the second chair, and a first internal lower surface of the first chair is substantially aligned with a second internal lower surface of the second chair to form an extended receiving surface and an extended receiving volume through the first chair and the second chair.

According to another aspect of the present technology, there is provided a chair for selectively connecting to a mounting surface. The chair includes a base including: a base body, an interior volume formed by the base body, two lateral openings formed in opposite lateral sides of the base body, the two lateral openings communicating with the interior volume, each lateral opening occupying at least a majority of an area of a corresponding lateral side of the base, and a top opening formed in a top side of the base body, the top opening communicating with the interior volume; a connector connected to the base, the connector being configured for selectively connecting the base to the mounting surface; and a seat portion connected to the top side of the base body, the seat portion being selectively moveable between at least an open position and a closed position, the seat portion being arranged: to provide a seating surface and to prevent access to the top opening when in the closed position, and to allow access to the top opening when in the open position.

In some embodiments, the seat portion is sized and arranged to provide seating for a single user.

In some embodiments, the connector includes a locking portion configured for connecting to the mounting surface; and an actuating portion operatively connected to the locking portion, the actuating portion being accessible on a front side of the base body.

In some embodiments, the chair further includes at least one side panel configured to be selectively connected to the base body, the at least one side panel closing one of the two lateral openings when connected to the base body.

In some embodiments, the seat portion is selectively moveable between at least the open position and the closed position by pivoting about a pivot axis.

In some embodiments, the pivot axis is aligned with a front side of the base, a rear edge of the seat portion rotating upward and forward when the seat portion is pivoted from the closed position to the open position.

In some embodiments, the seat portion includes at least one curved protrusion extending downward and forward from a forward portion of a bottom surface of the seat portion; and the base body includes at least one curved recess arranged to receive the at least one curved protrusion therein when the seat portion is in the closed position.

In some embodiments, the seat portion includes at least one post extending downward from a rear portion of the bottom side of the seat portion; the base includes at least one opening defined by the base body; and when the seat portion is in the closed position, the at least one post is received and selectively held in the at least one opening.

In some embodiments, the base further includes at least one rubber grommet disposed in the at least one opening, the at least one rubber grommet being configured to selectively maintain the at least one post in the at least one opening when the seat portion is in the closed position.

In some embodiments, the seat portion is selectively removable from the base.

In some embodiments, the front side of the base is closed by the base body such that the interior volume of the base is not accessible from the front side of the base.

In some embodiments, the chair further includes a backrest portion connected to and extending upwards from the base.

According to yet another aspect of the present technology, there is provided a modular seating assembly including a plurality of chairs configured to be selectively connected to a mounting surface in a plurality of positions. Each chair of the plurality of chairs includes a base including: a base body, an interior volume formed by the base body, two lateral openings formed in opposite lateral sides of the base body, the two lateral openings communicating with the interior volume, each lateral opening occupying at least a majority of an area of a corresponding lateral side of the base body, and a top opening formed in a top side of the base body, the top opening communicating with the interior volume; a connector connected at least in part to a bottom side of the base body, the connector being configured for connecting to the mounting surface; and a seat portion connected to the top side of the base body, the seat portion being selectively moveable between at least an open position and a closed position, the seat portion being arranged: to provide a seating surface and to prevent access to the top opening when in the closed position, and to allow access to the top opening when in the open position.

In some embodiments, at least one chair of the plurality of chairs further includes a backrest portion connected to and extending upwards from the base.

In some embodiments, at least one chair of the plurality of chairs further includes a corner backrest connected to the base of the at least one chair, the corner backrest extending upward from the base, at least a portion of the corner backrest being substantially perpendicular to the backrest portion of the chair.

In some embodiments, the assembly further includes at least one side panel configured to be selectively connected to the base body of at least one chair of the plurality of chairs, the at least one side panel closing one of the two lateral openings when connected to the base body of the at least one chair.

In some embodiments, for each chair of the plurality of chairs, lower edges of the lateral openings are substantially aligned with an internal lower surface of the base body, the internal lower surface defining a bottom of the interior volume; and when a first chair of the plurality of chairs is connected to the mounting surface adjacent to a second chair of the plurality of chairs: a first interior volume of the first chair communicates with a second interior volume of the second chair, and a first internal lower surface of the first chair is substantially aligned with a second internal lower surface of the second chair to form an extended receiving surface and an extended receiving volume through the first chair and the second chair.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Explanations and/or definitions of terms provided in the present application take precedence over explanations and/or definitions of these terms that may be found in any documents incorporated herein by reference.

For purposes of this application, terms related to spatial orientation such as front, rear, top, bottom, left, and right, are as they would normally be understood by a user of the chairs and seating systems described herein sitting thereon in a normal sitting position. Terms related to spatial orientation when describing or referring to components or sub-assemblies of the chair, separately from the chair, should be understood as they would be understood when these components or sub-assemblies are mounted to the chair, unless specified otherwise.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale.

DETAILED DESCRIPTION

The present technology will be described with respect to a watercraft having a substantially flat deck, for example a pontoon boat, and a modular seating system for connecting to floor tiles affixed to the deck. However, it is contemplated that the present technology could be applied to mounting the modular seating system on various other surfaces, such as docks as well as different types of watercraft with flat surface areas. Application of the present technology is therefore not intended to be limited to its use on pontoon boats or watercraft more generally.

Figure 1:
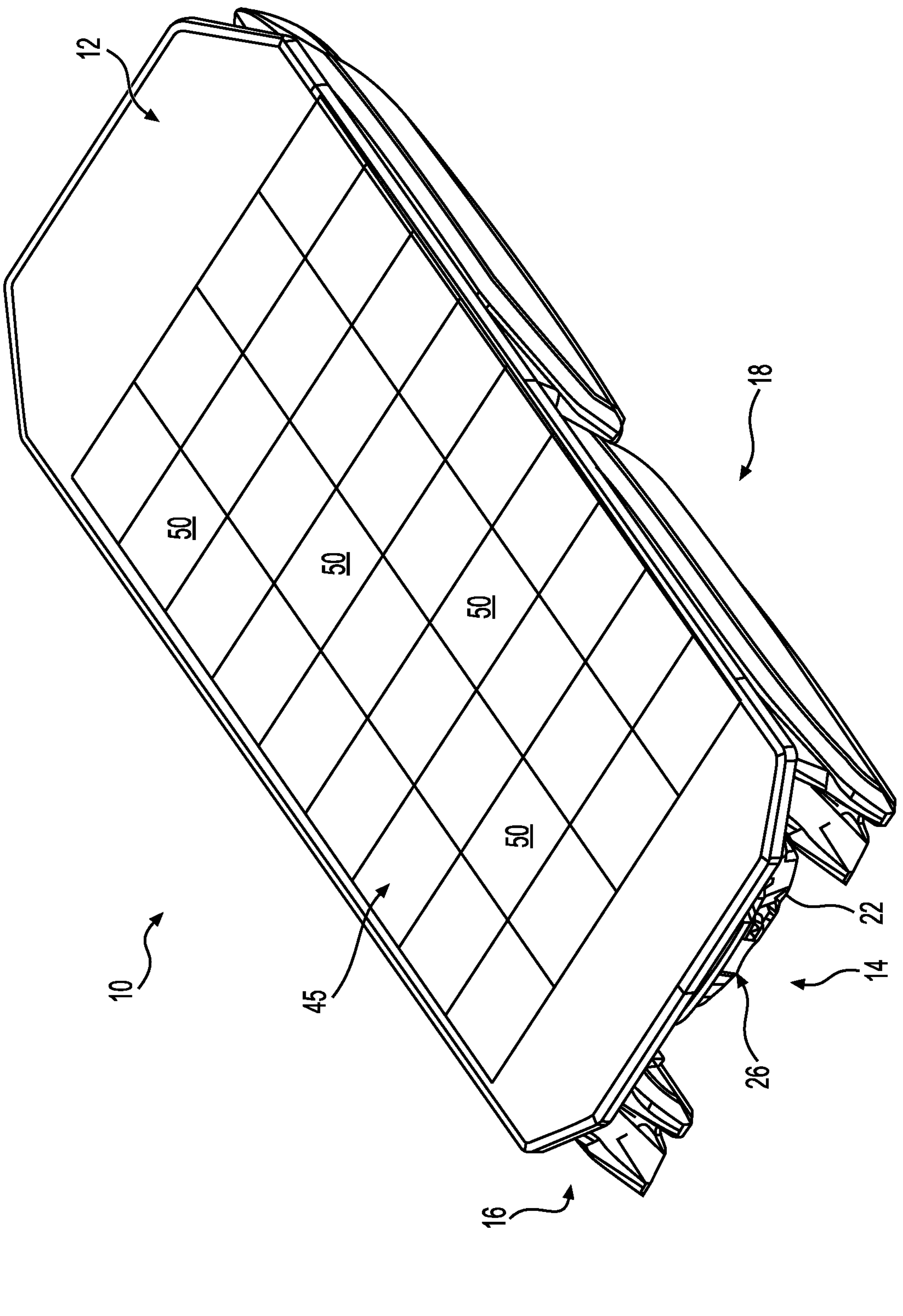
FIG. 1 is a top, rear, right side perspective view of a pontoon boat, with helm and furniture removed, in accordance with an embodiment of the present technology.

A pontoon boat 10 in accordance with one embodiment of the present technology is shown in FIG. 1. The boat 10 has a deck 12, a central pod 14, a left pod 16 and a right pod 18. The pods 14, 16, 18 are connected to a bottom of the deck 12. The central pod 14 is laterally centered relative to the deck 12. The left and right pods 16, 18 are disposed to the left and right of the central pod 14 respectively. The pods 14, 16, 18 buoyantly support the deck 12 above water. The central pod 14 has a central hull 22 supporting a jet propulsion system 26.

The boat 10 is propelled by a jet propulsion system 26 powered by a motor (not shown). The jet propulsion system 26 has a steering nozzle (not shown) used for steering the boat 10. A steering wheel (not shown) is operatively connected to the steering nozzle. A throttle lever (not shown) is operatively connected to the motor for controlling operation of the motor. The steering wheel and the throttle lever are located on a command console (not shown) provided on the deck 12. It is contemplated that other propulsion systems, such as a stern drive or a marine outboard engine, may be used to propel the boat 10. It is also contemplated that the steering wheel could be replaced by a handlebar and that the steering nozzle could be replaced by one or more rudders.

According to the present technology, the boat 10 is provided with a modular seating system 90 for providing changeable seating and storage arrangements for users of the boat 10. The system 90 includes a mounting surface 45 and a seating assembly 95 including a plurality of chairs 100 selectively connected to the mounting surface 45. The seating assembly 95 and the chairs 100 are described in more detail below.

Figure 2:
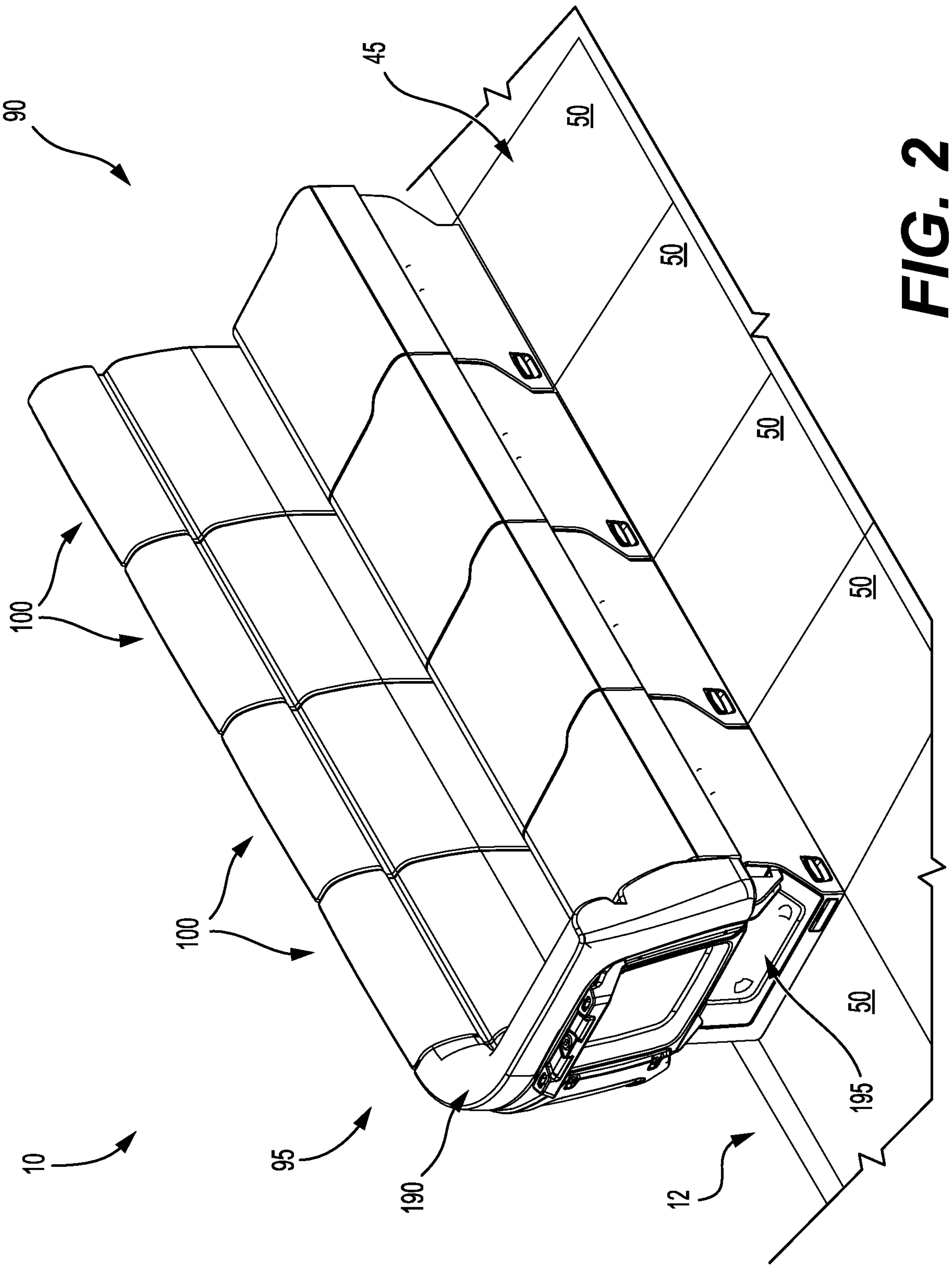
FIG. 2 is a top, front, right side perspective view of a modular seating system connected to the pontoon boat of FIG. 1.

The mounting surface 45, shown in FIGS. 1 and 2, is formed by a series of floor tiles 50. In other embodiments, it is contemplated that the mounting surface 45 could be formed from more or fewer of the tiles 50 than illustrated.

It is also contemplated that the mounting surface 45 could be formed from a larger continuous surface including a plurality of attachment features 51 (discussed further below).

In the illustrated embodiment, a majority of the deck 12 is covered by the floor tiles 50 affixed to a surface of the deck 12. More or less of the deck 12 could be covered by the tiles 50 in different embodiments. The floor tiles 50 form a majority of the deck 12 and are fixed to an underlying structure (not shown) using fasteners, such as screws or bolts (also not shown). In the present embodiment all of the floor tiles 50 are the same, but it is contemplated that some of the floor tiles 50 may differ from the others. The floor tiles 50 could be formed from different materials, depending on the specific embodiment or application, including for example being molded from composite materials, such as polypropylene or nylon, or other thermoplastic, impregnated with glass fiber.

Figure 3:
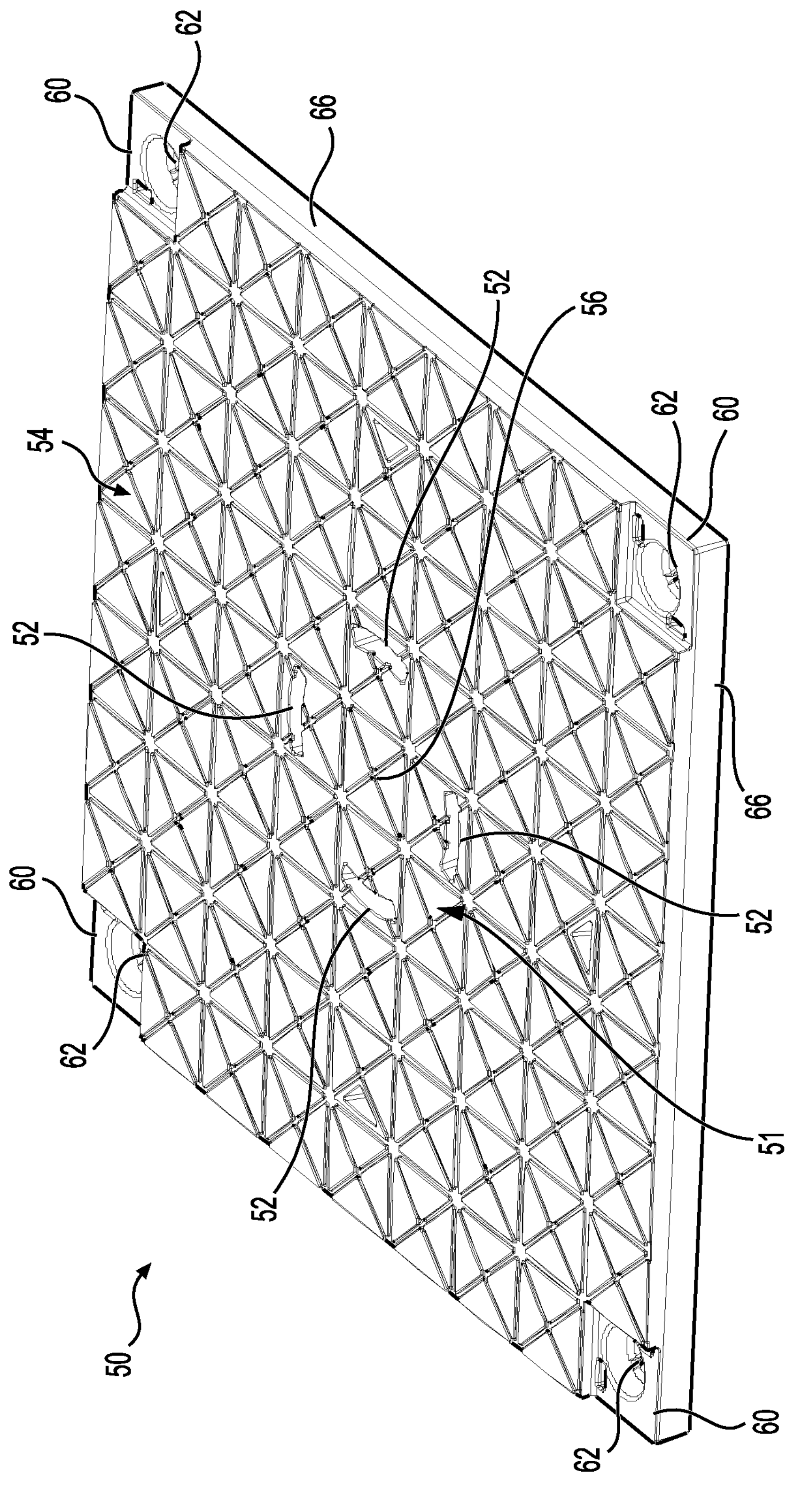
FIG. 3 is a top perspective view of a floor tile of the modular seating system of FIG. 2.

A floor tile 50 of the mounting surface 45, according to one non-limiting embodiment, is illustrated in more detail in FIG. 3. The floor tile 50 has a rectangular shape, specifically a square shape. It is contemplated that a variant of the floor tile 50 could have, for example, a rectangular shape with adjacent sides of unequal lengths. The floor tile 50 has an attachment feature 51 to which chairs 100 of the seating assembly 95 are selectively connected, as will be described in more detail below. In the illustrated embodiment, the attachment feature 51 is formed by four arcuate slots 52 formed on an upper surface 54 of the floor tile 50. The arcuate slots 52 are defined about a common center of curvature 56 of the four arcuate slots 52 and are positioned at a common radius of curvature of the four arcuate slots 52 from the common center of curvature 56. The arcuate slots 52 are open both on the upper surface 54 of the floor tile 50 and on an opposite end. With the use of a plurality of floor tiles 50 to form the mounting surface 45, the mounting surface 45 includes a plurality of attachment features 51 for selectively receiving more than one chair 100 and/or any given chair 100 in a multitude of different locations and/or orientations.

A gripping texture is formed on the upper surface 54 of the floor tile 50. In the present embodiment, the gripping texture consists of repeating triangular pattern, although the particular pattern could vary. The floor tile 50 has a perimetric wall 66 that extends perpendicularly downward from the upper surface 54. A mounting cavity 60 and a through aperture 62 are positioned on each corner of the floor tile 50. Fasteners (not shown) are inserted via the through apertures 62 for fixedly attaching the floor tile 50 to a receiving surface, such as the deck 12 of the watercraft 10. Following the attachment by use of fasteners, caps (not shown) are received in the mounting cavities 60 over the fasteners in order to provide a continuous surface. In some embodiments, it is also contemplated that the caps could be formed with the same gripping texture as the upper surface 54 of the tile 50.

Figure 4:
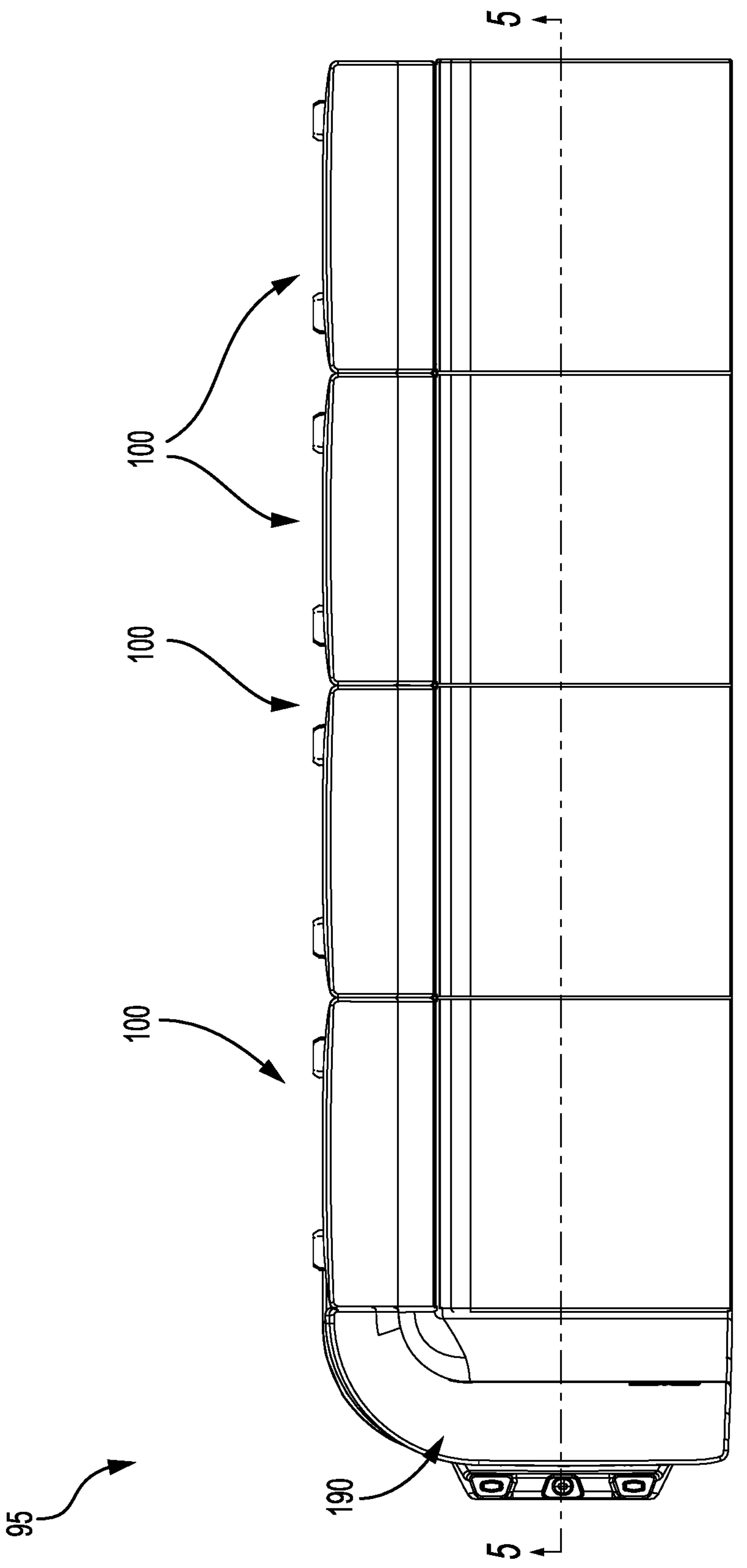
FIG. 4 is a top plan view of a seating assembly of the modular seating system of FIG. 2.

With additional reference to FIGS. 4 to 8, the seating assembly 95 is formed from two or more chairs 100 positionable in a number of different positions and orientations on the mounting surface 45, including adjacent to one another (see FIGS. 2 and 4). In the embodiment illustrated in FIGS. 4 to 6, the assembly 95 includes four chairs 100, although this is not meant to be limiting. Different embodiments of the modular seating system 90 could have more or fewer than four chairs 100. The four chairs 100 of the present embodiment are single-seat chairs 100, configured to providing a seating surface for one user. It is contemplated that only some of the chairs of the assembly 95 could be single-seat chairs 100. It is also contemplated that two-seat chairs could be provided in some embodiments. Additional components of the seating assembly 95 are described below.

With additional reference to FIGS. 9 to 13, one of the chairs 100 of the modular seating system 90 according to one non-limiting embodiment will be described in more detail. The chairs 100 of the present embodiment are all identical, although it is contemplated that some chairs 100 may have one or more varying features.

The chair 100 includes a base 120 supporting remaining portions of the chair 100 and for selectively connecting to the mounting surface 45. The base 120 has a base body 122, which generally provides a structure for the base 120. The base body 122 is formed from injection-molded plastic, but it is contemplated that the base body 122 could be formed from different materials, including but not limited to metal, fiberglass or wood.

The base 120 occupies approximately the same floor area (i.e. footprint) as each of the floor tiles 50. In this way, two chairs 100 are able to be connected to two adjacent attachment features 51, and the bases 120 of the two adjacently connected chairs 100 generally abut one another. For embodiments where more than one attachment feature 51 is defined in a unit of the mounting surface 45, it is contemplated that the attachment features 51 could be spaced in order to arrange one or more seats 100 immediately adjacent to one another.

The base 120 has an interior volume 125 defined therein by the base body 122. As will be described further below, the interior volume 125 is configured to serve as a storage area to receive and/or store objects therein. The base 120 includes two lateral openings 128 formed in opposite lateral sides of the base body 122. In the illustrated embodiment, the lateral opening 128 are formed in left and right sides of the base body 122. The two lateral openings 128 communicate with the interior volume 125. The base body 122 defines a closed perimeter of each of the two lateral openings 128, such that the base body 122 surrounds both above and below the lateral openings 128. In the illustrated embodiment, each lateral opening 128 occupies a majority of the area of the corresponding lateral side of the base body 122, although the exact size and area of the openings 128 could vary. Lower edges of the lateral openings 128 are substantially aligned with an internal lower surface 127 of the base body 123, where the internal lower surface 127 defines a bottom of the interior volume 125.

The base 120 further includes a top opening 130 formed in a top side of the base body 122. The top opening 130 communicates with the interior volume 125, allowing access by the user through the top opening 130 to the interior volume 125. Front and rear sides of the base 120 are closed by the base body 122 such that the interior volume 125 is not accessible from front and rear exterior sides of the base 120.

The chair 100 also includes a seat portion 140 selectively connected to the base 120. The seat portion 140 is selectively connected to the top side of the base body 120. The seat portion 140 has a seating surface 142, on a top side thereof, sized and arranged for a single user. As is noted above, different embodiments of the chair 100, and thus the seat portion 140, could be configured to provide a seating surface for two or more people.

The seat portion is selectively moveable between an open position (FIGS. 7, 8, and 11 to 13) and a closed position (FIGS. 2, 4 to 6, 9, and 10), as well as a variety of intermediate positions. In the present embodiment, only the open and closed positions are stable positions of the seat portion 140, where the seat portion 140 can remain in the position without support from the user. It is contemplated that in some embodiments, additional mechanisms could be included to provide additional stable positions of the seat portion 140.

When in the closed position, the seat portion 140 is arranged to provide the seating surface 142 for sitting and to prevent access to the top opening 130 of the base 120. When the seat portion 140 is in the open position, the chair 100 is arranged to allow access to the top opening 130, and therefore also allow access to the interior volume 125.

Figure 12:
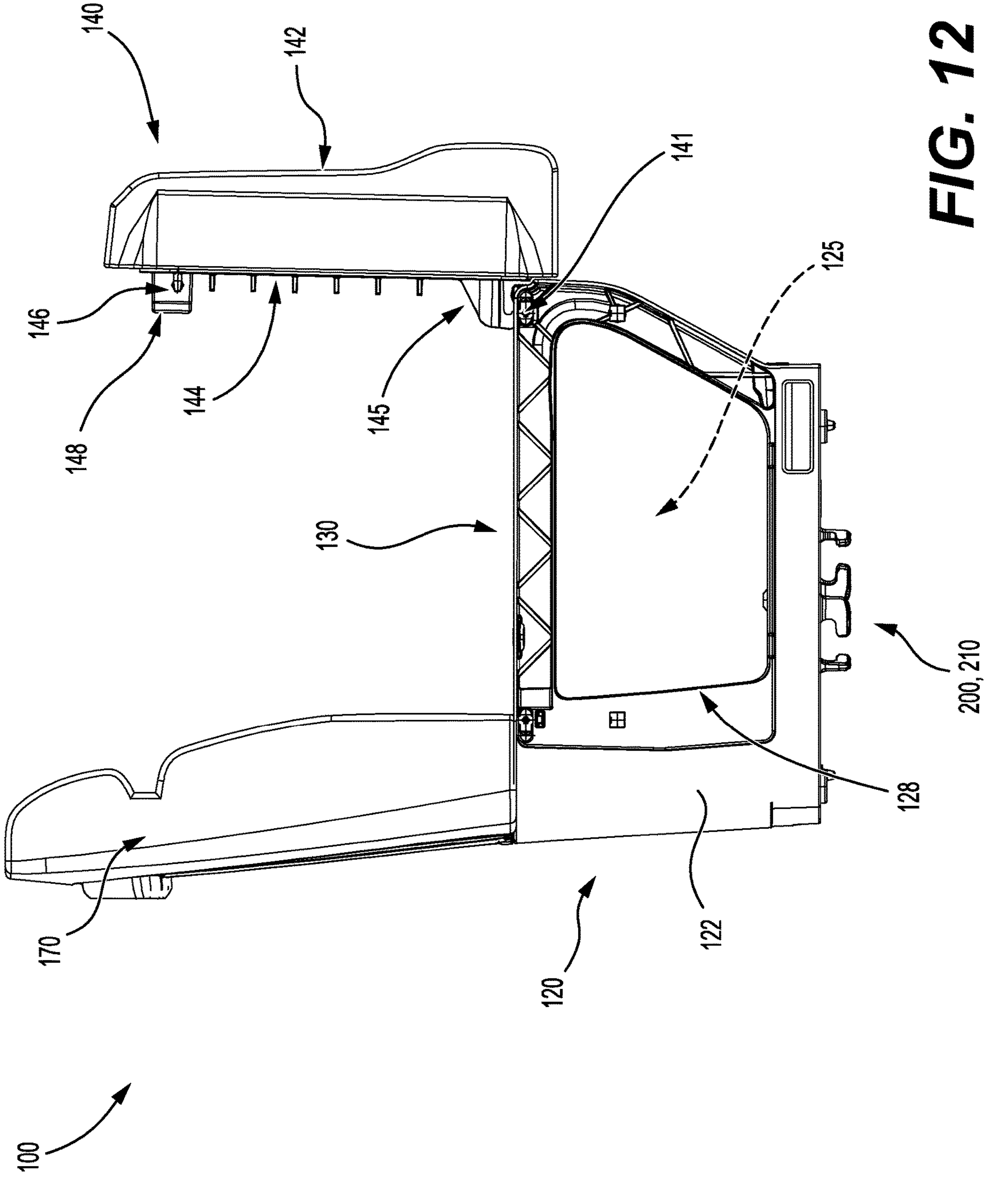
FIG. 12 is a right side elevation view of the chair of FIG. 9, with the seat portion in the open position.
Figure 13:
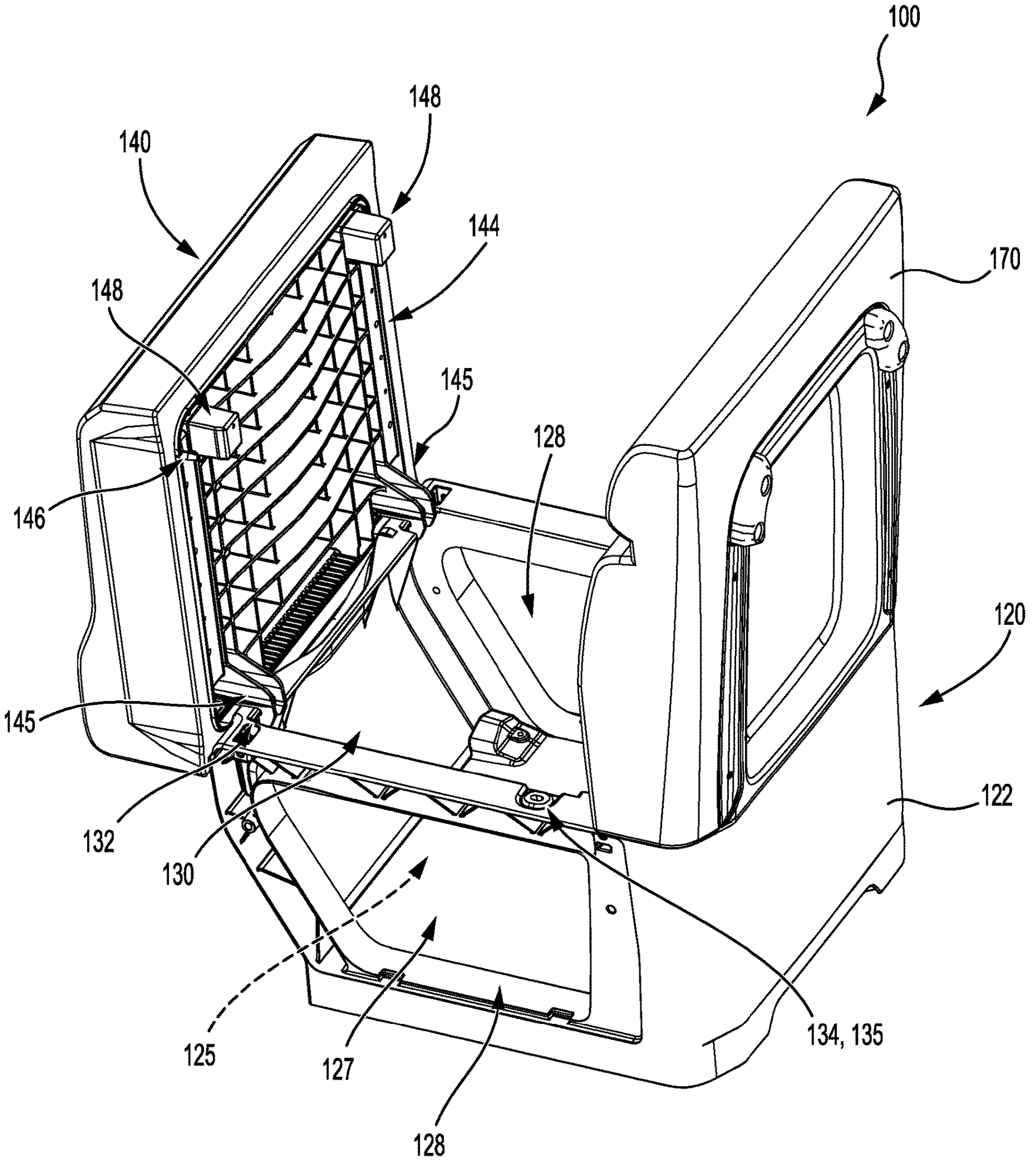
FIG. 13 is a top, rear, left side perspective view of the chair of FIG. 9, with the seat portion in the open position.

As can be seen in FIGS. 12 and 13, the seat portion 140 includes two curved protrusions 145 extending downward and forward from a forward portion of a bottom surface 144 of the seat portion 140. The base body 122 includes two corresponding curved recesses 132, arranged to receive the curved protrusions 145 therein when the seat portion 140 is in the closed position. The curved protrusions 145 allow the seat portion 140 to pivot between the closed position and the open position, while providing a tool-less removal of the seat portion 140 from the open position. To remove the seat portion 140 from the base 120, the seat portion 140 is pulled generally straight upward from the open position. Similarly, the seat portion 140 is selectively attached to the base 120 by aligning and lowering the curved protrusions 145 into the recesses 132.

The seat portion 140 is selectively moveable between the open position and the closed position by pivoting about a pivot axis 141 (see FIG. 12). In the present embodiment, the pivot axis 141 is defined by the center of rotation of the curved protrusions 145 rotating into or out of the corresponding recesses 132. The pivot axis 141 is aligned with the front side of the base 120, such that a rear edge of the seat portion 140 rotates upward and forward when the seat portion 140 is pivoted from the closed position to the open position.

The seat portion 140 further includes two alignment blocks 148, disposed on left, forward and right, forward portions of the bottom side 144. Exterior edges of the blocks 148 align with perimeter of the top opening 130 of the base 120 when the seat portion 140 is in the closed position. The blocks 148 thus aid in preventing lateral movement of the seat portion 140 when in the closed position, as well as in providing the proper positioning of the seat portion 140 when rotating from the open position and the closed position.

In order to aid in maintaining the seat portion 140 in the closed position, the seat portion 140 includes two posts 146 extending downward from a rear portion of the bottom side 144 of the seat portion 140. It is contemplated that the seat portion 140 could be provided with one post 146, on either the right or left side of the seat portion 140. The base 120 includes two corresponding post openings 134 defined by the base body 122. When the seat portion 140 is in the closed position, the posts 146 are received in the post openings 134.

The base 120 further includes two rubber grommets 135, one disposed in each of the post openings 134. The rubber grommets 135 are configured to selectively maintain the posts 146 in the post openings 134 when the seat portion 140 is in the closed position. A central opening of each grommet 135 is slightly smaller than the distal end of each post 146, maintaining the posts 146 therein unless the user pulls upward on the seat portion 140 with a threshold force to slightly deform the grommets 135 to permit passage of the distal ends of the posts 146 therethrough.

It is contemplated that the chair 100 and/or the seat portion 140 could include additional or alternative features for selectively maintaining the seat portion 140 in the closed position. For example, embodiments of the chair 100 could include, for example, hooks, clips, clasps or latches for securing the seat portion 140 in the closed position.

The chair 100 further includes a backrest portion 170, connected to and extending upwards from the base 120. A forward side of the backrest portion 170 are padded for comfort of a user, although different styles of backrests is contemplated. Although all the chairs 100 illustrated herein include backrest portions 170, it is contemplated that one or more chairs 100 of the assembly 95 could exclude the backrest portion 170, for example as a bench seat style arrangement.

Figure 14:
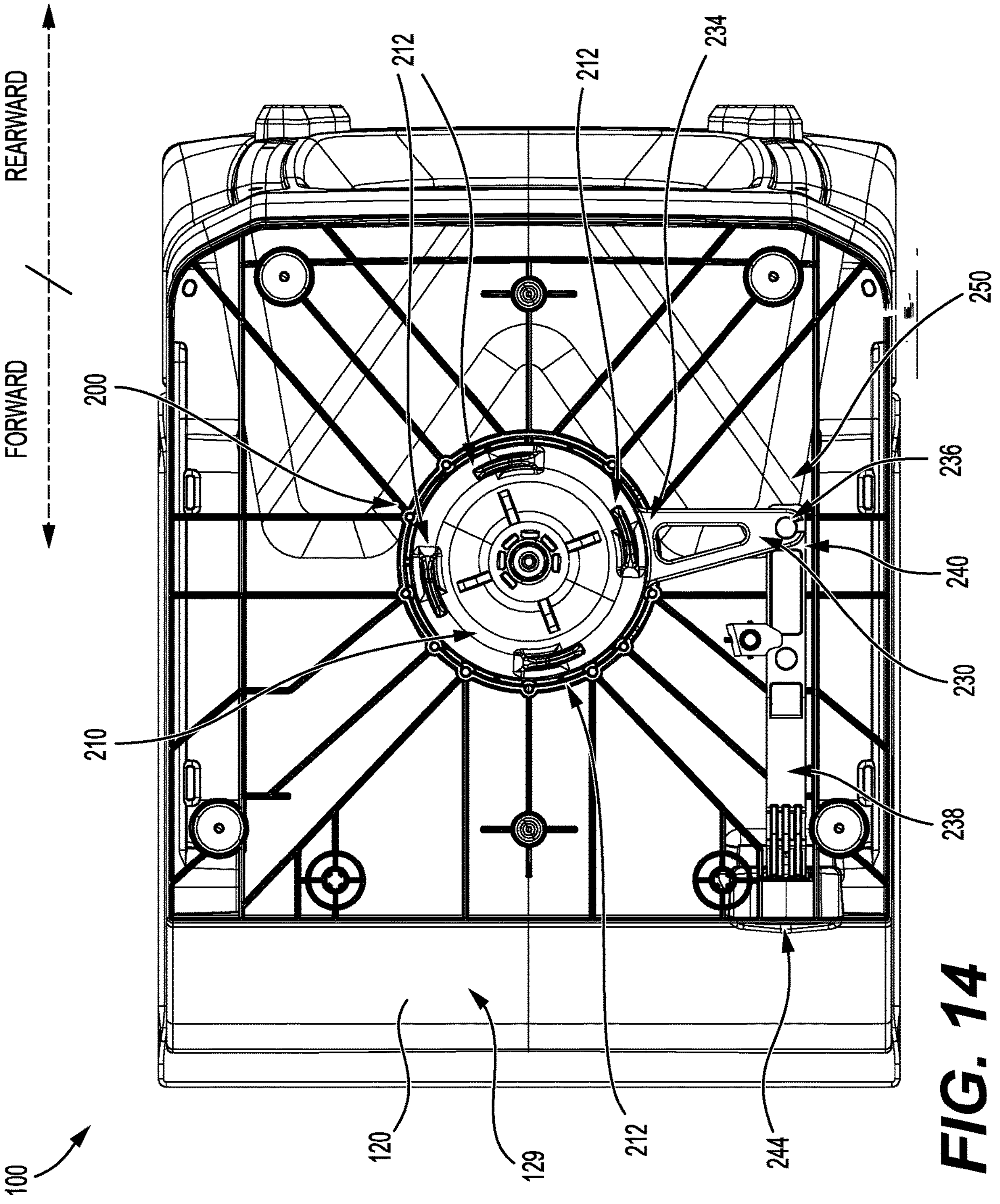
FIG. 14 is a bottom plan view of the chair of FIG. 9.

With reference to FIG. 14, a connector 200, also referred to as an attachment member 200, is operatively connected to the chair base 120. More specifically, the connector 200 is connected to a bottom side 129 of the base body 122. It is contemplated that some components of the connector 200 could be arranged in different portions of the base 120. Embodiments of the connector 200, as well as embodiments of the attachment features 51 and the floor tiles 50, are described in additional detail in U.S. patent application Ser. No. 16/887,481, filed May 29, 2020, the entirety of which is incorporated herein by reference.

The connector 200 includes a locking portion 210 configured for connecting to one of the attachment features 51 of the mounting surface 45. The connector 200 also includes an actuating portion 250 operatively connected to the locking portion 210, configured to allow the user to selectively connect and disconnect the chair 100 from the mounting surface 45, described further below.

Figure 15:
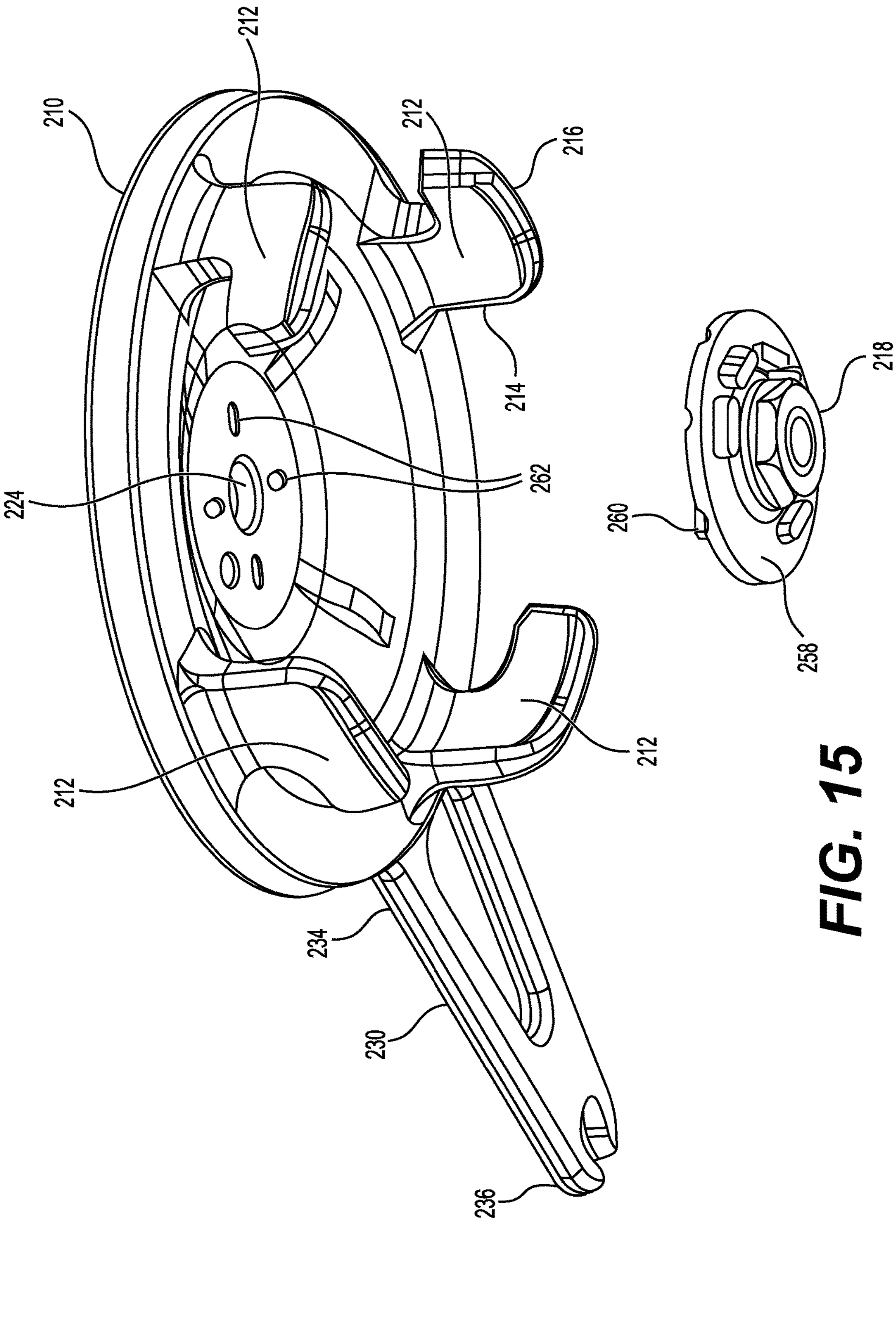
FIG. 15 is a partially exploded, bottom perspective view of a connector of the chair of FIG. 9.

With additional reference to FIG. 15, the locking portion 210 in the present embodiment is specifically a connector disk 210 pivotably mounted to the bottom side 129 of the base body 122. Although the connector 210 is illustrated in the form of the disk 210 in the present embodiment, other types of connectors or attachment members are contemplated.

The disk 210 has four arcuate hooks 212 that extend under the bottom section 208. It is contemplated that only two or three arcuate hooks 212 could be provided. The arcuate hooks 212 are generally L-shaped. Each arcuate hook 212 includes a foot 214 fixedly connected to the disk 210 and a free end 216 extending perpendicularly from the foot 214. The disk 210 and the arcuate hooks 212 are molded as a single piece from composite thermoplastic materials, specifically polypropylene, in one non-limiting example. The disk 210 and the arcuate hooks 212 could also be made of steel, aluminum, nylon impregnated with glass fiber, or another metal in different embodiments.

A nut 218 is disposed underneath the disk 210 and a bolt 220 is inserted through a bore (not shown) provided in the base body 122 and through a bore 224 provided in the disk 210 so that the bolt 220 engages the nut 218, the disk 210 and the base 120. In this manner, the disk 210 is pivotally mounted to the base 120 by the bolt 220 and the nut 218. A pivot axis of the disk 210 is defined by an axis of the bolt 220. It is contemplated that a fastener other than a bolt 220 could be used. As shown in FIG. 15, the nut 218 includes a flange 258 having projections 260 that are received within recesses 262 of the disk 210 in order to prevent a rotation of the nut 218 with respect to the disk 210.

As can be seen in FIG. 12, a majority of the disk 210 is located within a recess (not shown) provided in the bottom side 129 of the base body 122, with the arcuate hooks 212 extending below a lower edge of the base body 122. In this way, the arcuate hooks 212 can be inserted into one of the attachment features 51 in order to connect the chair 100 to one of the tiles 50. Connection of the chair 100 to a tile 50 is described in more detail below.

The actuating portion 250 of the connector 200 includes a link 230 connected to and extending radially outwards from the disk 210. The link 230 is located within the base 120, more particularly within a bottom portion of the base body 122. The link 230 has a medial end 234 connected to a periphery of the disk 210 and a lateral end 236 opposite from the medial end 234. While the link 230 is integrally connected to the disk 210 in the illustrated embodiment, it is contemplated that the medial end 234 could be differently connected to the disk 210. For example the link 230 could be fastened or welded to the disk 210.

The actuating portion 250 also includes an arm 238 operatively connected to the link 230. The arm 238 has a proximal end 240 pivotably connected to the lateral end 236 of the link 230. A handle 244 is formed in a distal end of the arm 238. The actuating portion 250, and specifically the handle 244 thereof, is accessible on the front side of the base body 122. The handle 244 is received in a recess 123 in a front side of the base body 122.

Sliding the arm 238 partially in or out of the base 120 by action of the handle 244 causes pivoting of the link 230 and of the disk 210 about the pivot axis of the disk 210. In the present embodiment, the disk 210 and the link 230 are configured to pivot over a range of 15 degrees. It is contemplated that in some other embodiments, the disk 210 and the link 230 could be configured to pivot up to a range of 15 degrees+/−5%.

In operation, to attach the chair 100 to the floor tile 50, the arm 238 and the handle 244 are initially pulled out from the bottom section of the chair 100. With the handle 244 in the extended position, the four arcuate hooks 212 are positioned for alignment with the four arcuate slots 52 of the attachment feature 51. The chair 100 is then lowered onto the desired floor tile 50, in the desired final orientation, such that the four arcuate hooks 212 are inserted in the four arcuate slots 52.

To lock the chair 100 in its position on the floor tile 50, the handle 144 is pushed inwards towards the base 120 until the handle 144 is substantially flush with the front outer edge of the base body 122 (as shown in the Figures). Inward motion of the handle 144 causes the arm 239 to pivot the link 230, thereby rotating the disk 210 by about 15 degrees counter-clockwise in the shown embodiment. Rotation of the disk 210 causes the arcuate hooks 212 to rotate within and engage with the arcuate slots 52 of the tile 50.

To subsequently disconnect (dismount) the chair 100 from the floor tile 50, the handle 244 is pulled outward from the base 120 to pivot the link 230 and the disk 210 by about 15 degrees clockwise. By rotating the disk 210, the hooks 212 disengage from the attachment feature 51 of the floor tile 50 and the chair 100 can be lifted from the floor tile 50.

Returning to FIGS. 2 and 4 to 8, in the present embodiment the seating assembly 95 includes components in addition to the chairs 100. It is contemplated that the modular seating system 90 and/or the seating assembly 95 could include additional accessories or components, including but not limited to tables, storage containers and sound systems.

The seating assembly 95 further includes a corner backrest 190. The corner backrest 190 is selectively connected to the base 120 of one of the chairs 100, the right-most chair 100 of the pictured assembly 95 in the example illustration. The corner backrest 190 extends upward from the base 190, and specifically a lateral side thereof. Most of the corner backrest 190 is substantially perpendicular to the backrest portion 170, with a curved portion configured to align with the corresponding backrest portion 170 to provide a continuous backrest surface to the user. The corner backrest 190 could be differently shaped or omitted, depending on the embodiment.

The seating assembly 95 also further includes one or more side panels 195 for selectively connecting to the base body 122 of one or more of the chairs 100. The side panel 195, when connected to one of the bases 120, closes the lateral opening 128 to which it is connected. In the illustrated embodiment, the assembly 95 includes two side panels 195 for closing the two lateral openings 128 which are not abutting another base 120 of the assembly 95.

Figure 5:
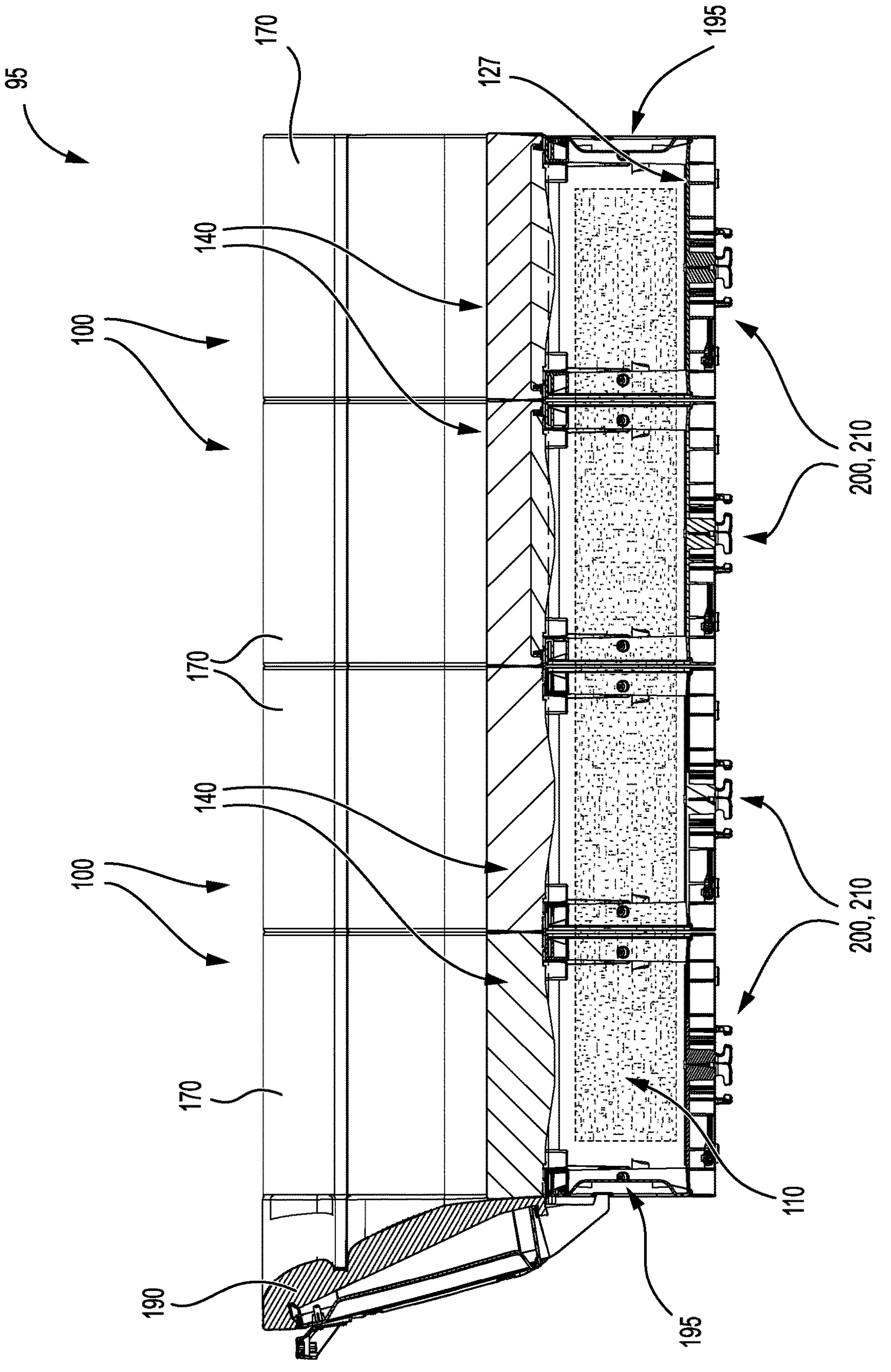
FIG. 5 is a cross-sectional view of the seating assembly of FIG. 4, taken along line 5-5 of FIG. 4.
Figure 6:
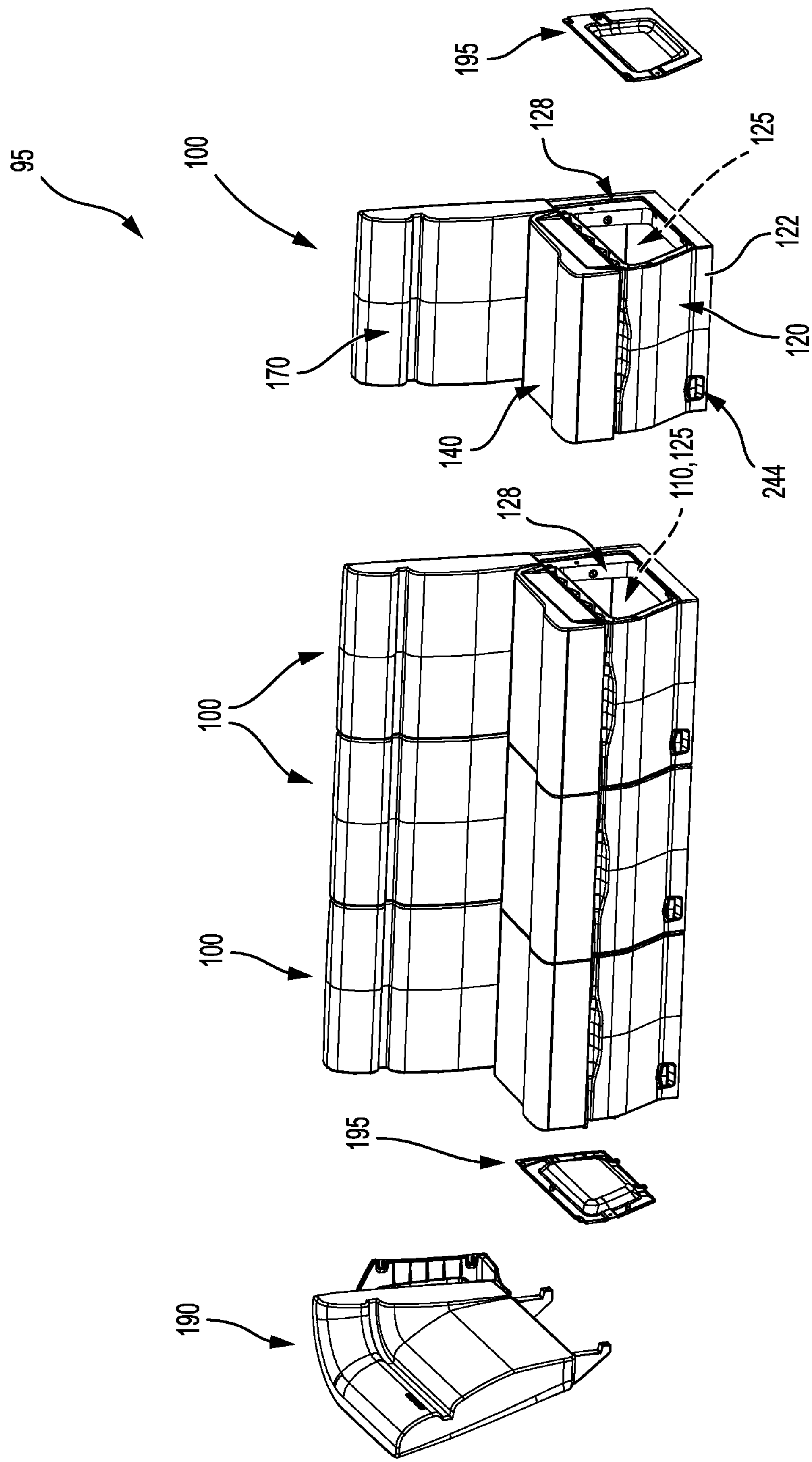
FIG. 6 is a partially exploded perspective view of the seating assembly of FIG. 4.
Figure 7:
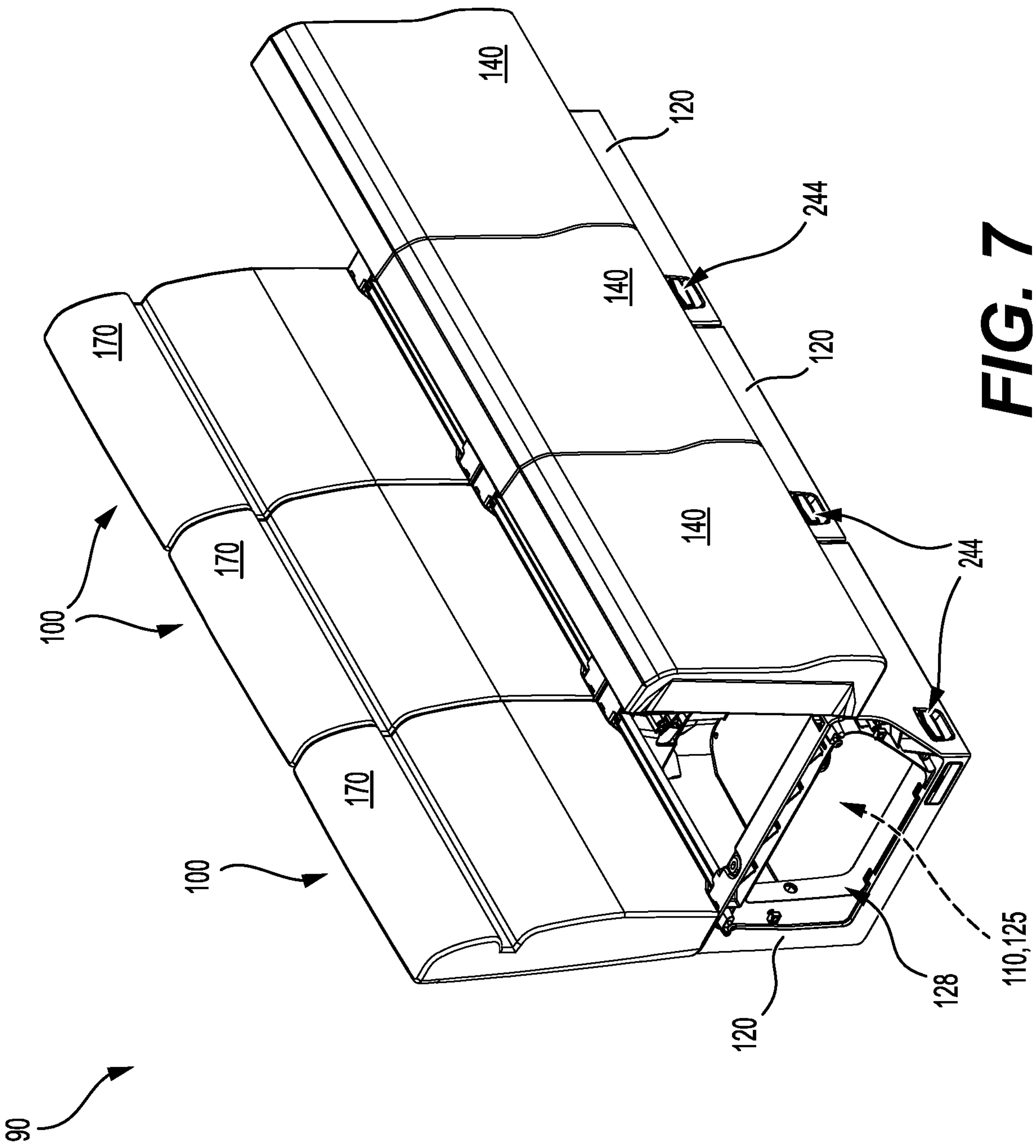
FIG. 7 is a top, front, right side perspective view of three chairs of the seating assembly of FIG. 4, with seat portions of the chairs in an open position.
Figure 8:
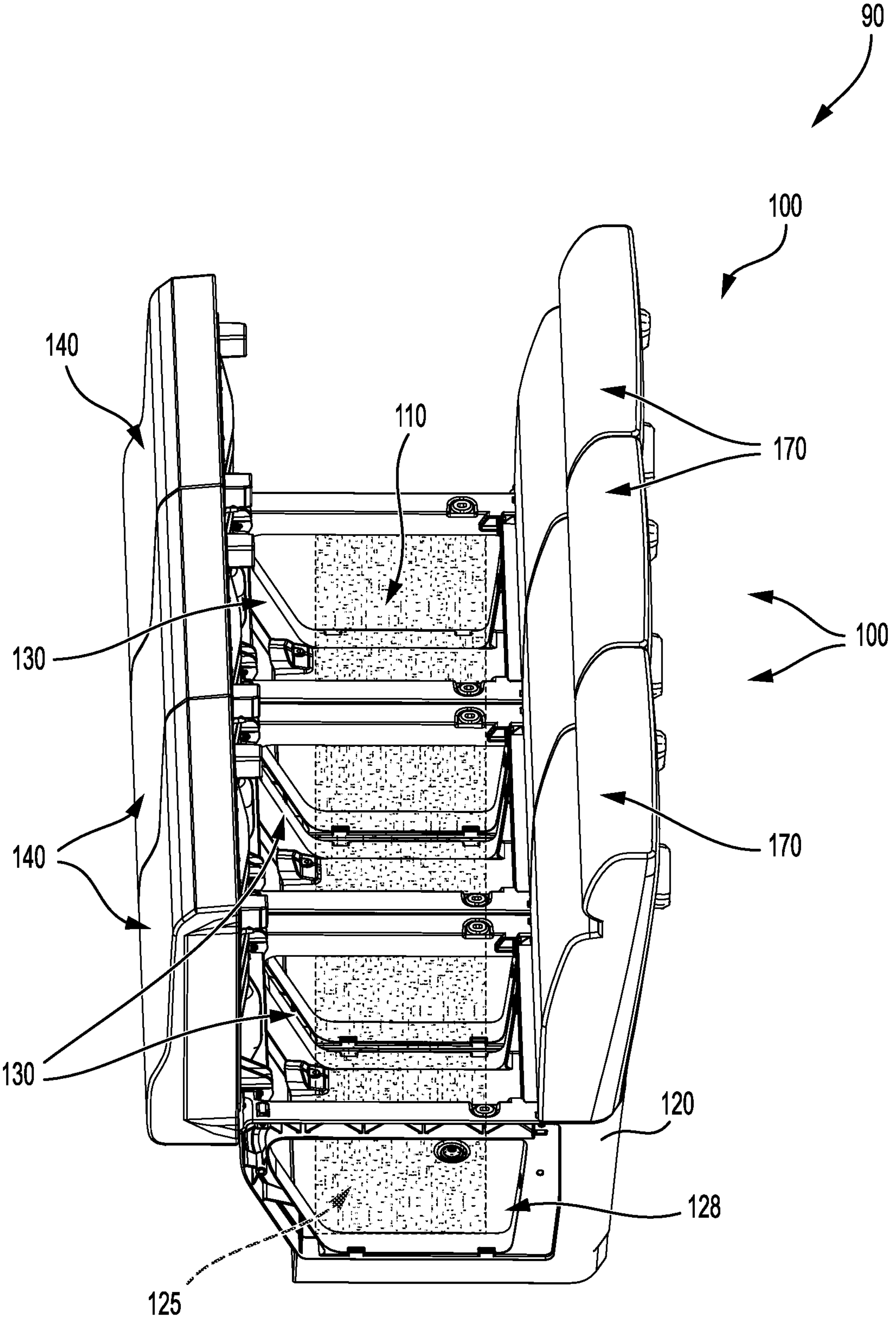
FIG. 8 is a top, left side perspective view of the three chairs of FIG. 5, with the seat portions of the chairs in the open position.
Figure 9:
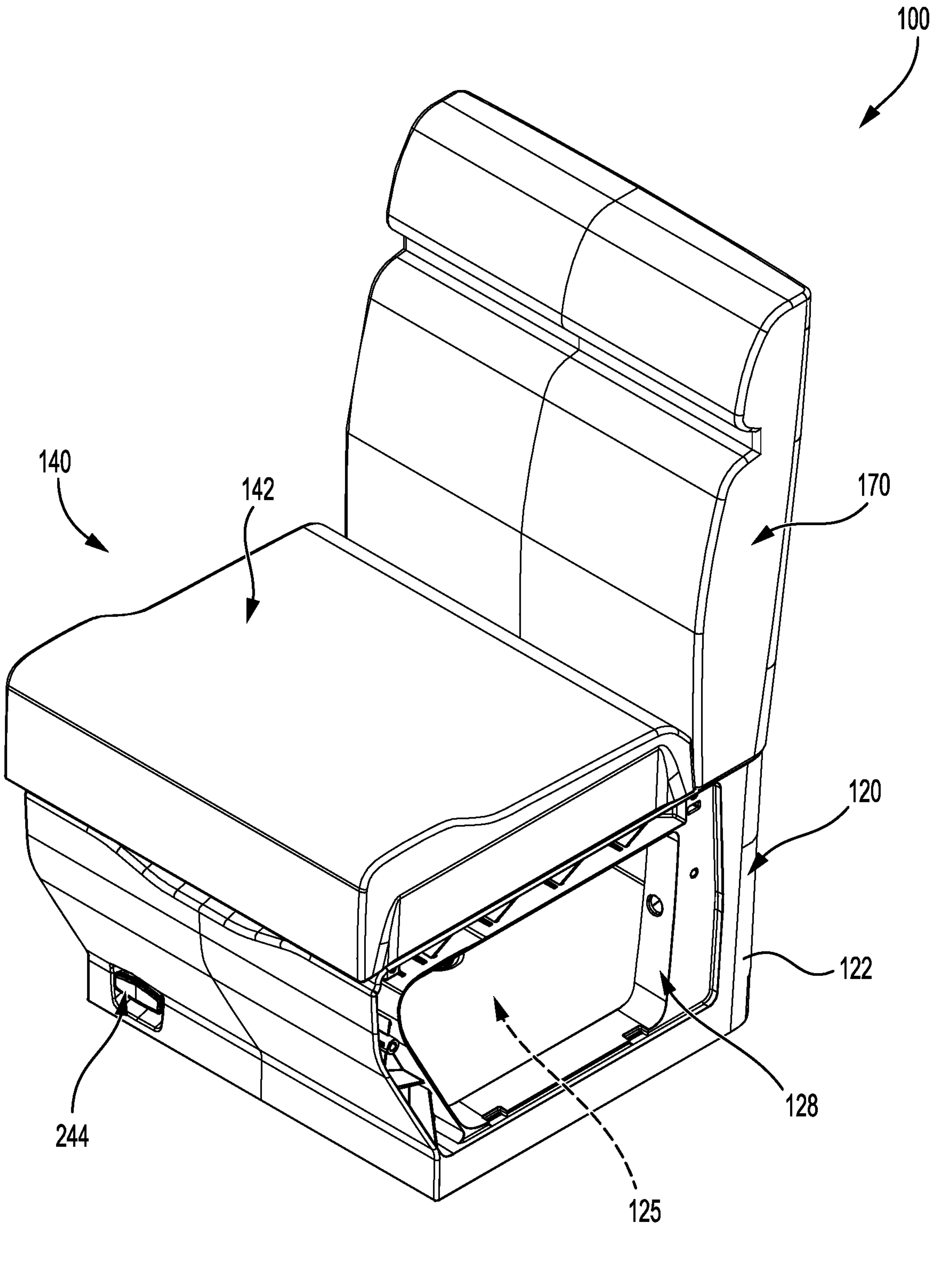
FIG. 9 is a top, front, left side perspective view of one of the chairs of the modular seating system of FIG. 3, with the seat portion in a closed position.
Figure 10:
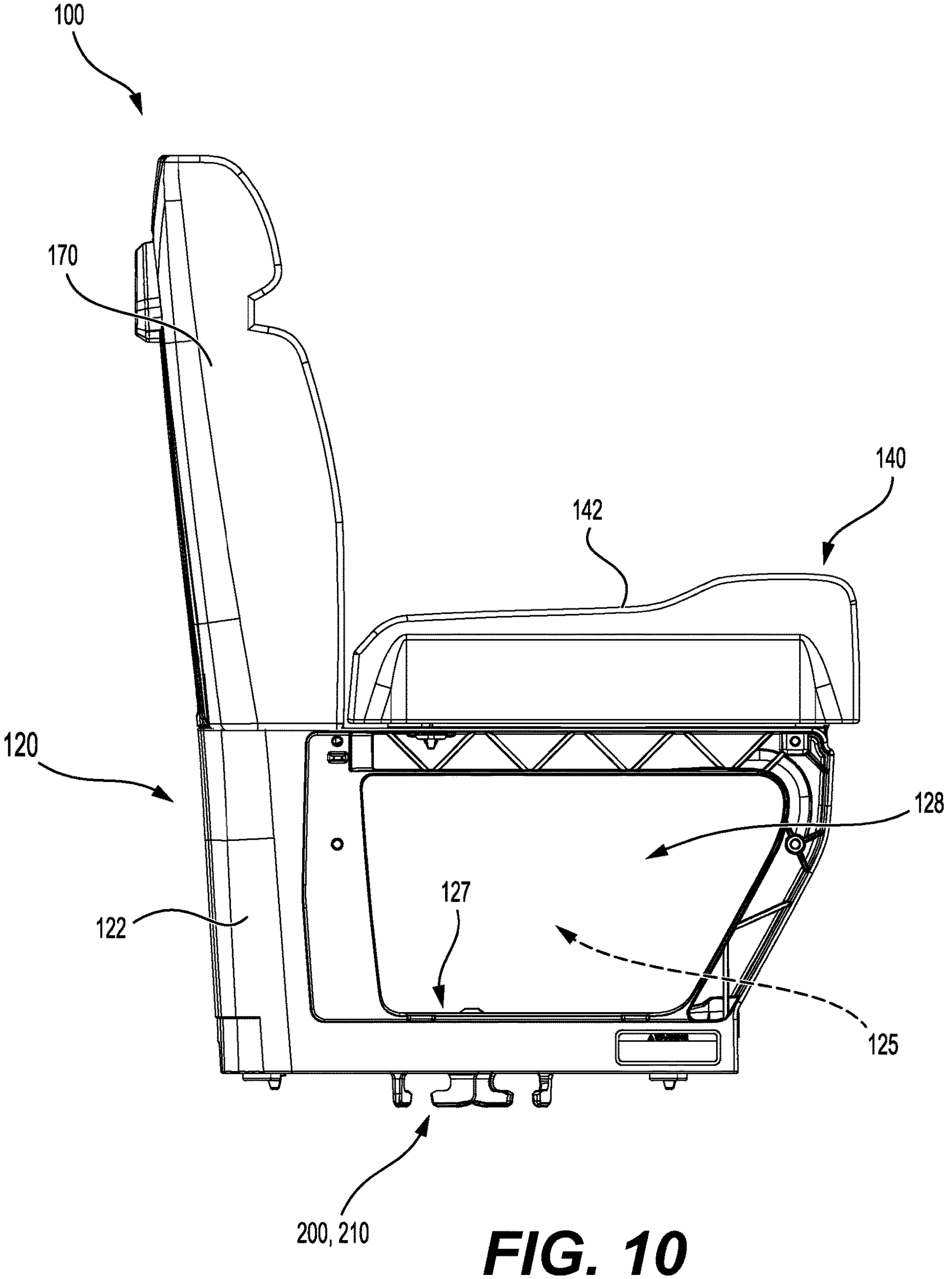
FIG. 10 is a right side elevation view of the chair of FIG. 9, with the seat portion in the closed position.
Figure 11:
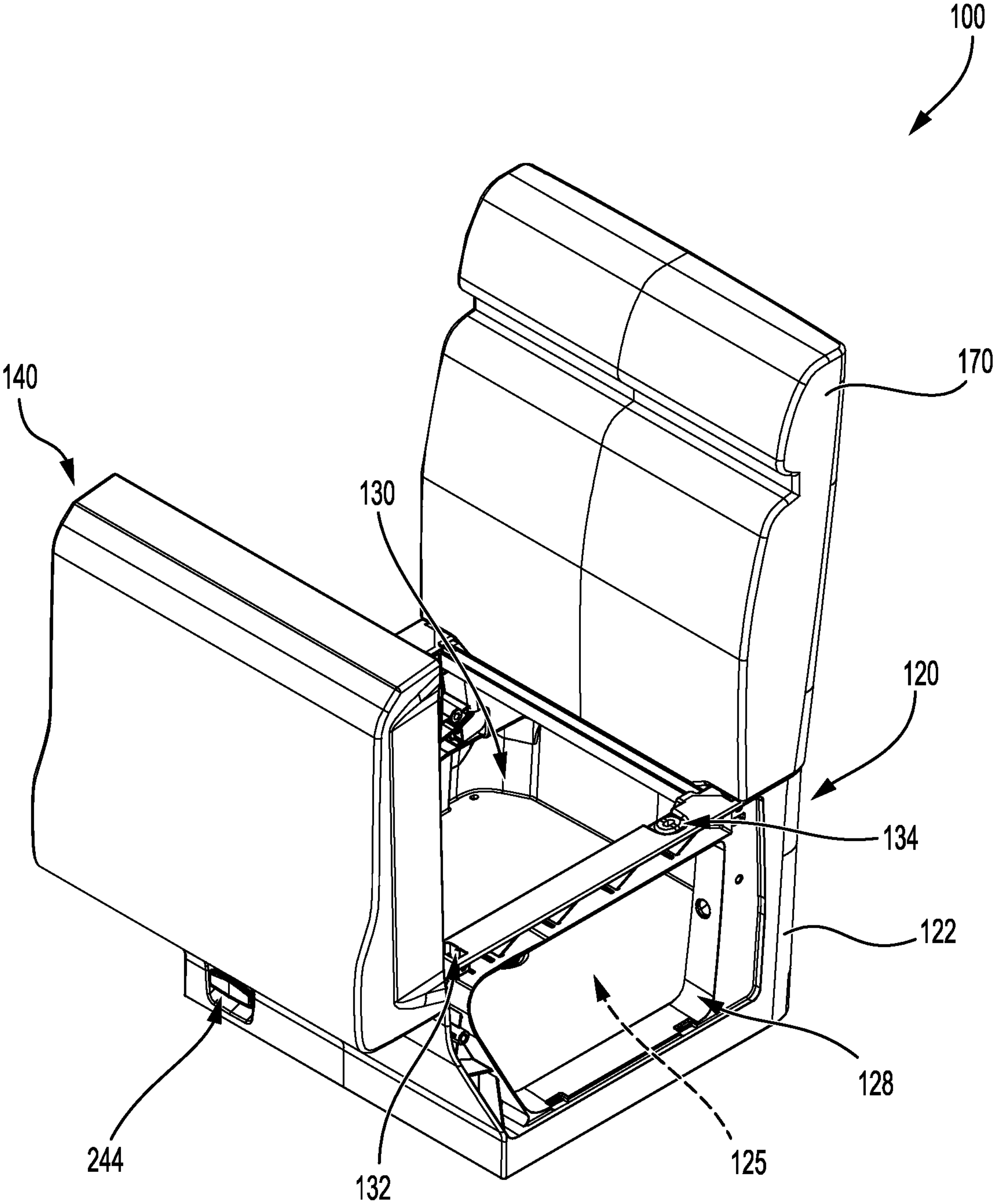
FIG. 11 is a top, front, left side perspective view of the chair of FIG. 9, with the seat portion in the open position.

When two or more chairs 100 are connected to the mounting surface 45 adjacent to one another, the seating assembly 95 is configured to provide seating for multiple people (see FIG. 2). As is illustrated in FIGS. 5 and 8, the adjacent arrangement of multiple chairs 100 also provides an extended storage volume 110. The extended storage volume 110 is formed from the interior volumes 125 of adjacently arranged chairs 100, with adjacent interior volumes 125 communicating with one another through their respective lateral openings 128.

With the inclusion of the side panels 195 on each end of the row of chairs 100, the extended storage space 110 is surrounded by the base bodies 122 on bottom, front, and rear sides, enclosed by the side panels 195 on each lateral side. The extended storage space is selectively closed by the seat portions 140 on the top side, when the seat portions 140 are in their closed positions. As is noted above, the internal lower surfaces 127 are substantially aligned with a lower edge of their corresponding lateral opening 128. A lower surface of the extended storage space 110 is thus generally flat and aligned through the adjacently arranged chairs 100, providing an extended bottom surface of the extended storage space 110 (FIG. 5).

In this way, the modular seating system 90 provides flexible seating arrangements, where separate chairs 100 can be positioned in a variety of places and orientations on the mounting surface 45. When a larger storage space is desired, however, the chairs 100 can also be positioned side-by-side to create the extended storage space 110 therethrough.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A modular seating system comprising:
- a mounting surface having a plurality of attachment features formed therein; and
- a plurality of chairs, each chair of the plurality of chairs comprising:
  - a base including:
    - a base body,
    - an interior volume formed by the base body,
    - two lateral openings formed in opposite lateral sides of the base body, the two lateral openings communicating with the interior volume, each lateral opening occupying at least a majority of an area of a corresponding lateral side of the base body, and
    - a top opening formed in a top side of the base body, the top opening communicating with the interior volume;
  - a connector connected at least in part to a bottom side of the base body; and a seat portion connected to the top side of the base body, the seat portion being selectively moveable between at least an open position and a closed position, the seat portion being arranged:

to provide a seating surface and to prevent access to the top opening when in the closed position, and to allow access to the top opening when in the open position, each of the plurality of attachment features being configured for receiving the connector of each chair of the plurality of chairs for selectively connecting each chair to the mounting surface.

2. The system of claim 1, wherein at least one of the plurality of chairs is a single-seat chair.

3. The system of claim 1, wherein the connector includes:

a locking portion configured for connecting to at least one attachment feature of the plurality of attachment features; and an actuating portion operatively connected to the locking portion, the actuating portion being accessible on a front side of the base body.

4. The system of claim 1, wherein at least one chair of the plurality of chairs further comprises a backrest portion connected to and extending upwards from the base.

5. The system of claim 1, further comprising at least one side panel configured to be selectively connected to the base body of at least one chair of the plurality of chairs, the at least one side panel closing one of the two lateral openings when connected to the base body of the at least one chair.

6. The system of claim 1, wherein the seat portion is selectively moveable between at least the open position and the closed position by pivoting about a pivot axis.

7. The system of claim 1, wherein the base body defines a closed perimeter of each of the two lateral openings of the base body.

8. The system of claim 1, wherein the mounting surface is a deck of a watercraft.

9. The system of claim 1, wherein, when a first chair of the plurality of chairs is connected to the mounting surface adjacent to a second chair of the plurality of chairs:

a first lateral opening of the two lateral openings of the first chair is adjacent to a second lateral opening of the two lateral openings of the second chair; and a first interior volume of the first chair communicates with a second interior volume of the second chair through adjacently disposed first lateral opening and second lateral opening.

10. The system of claim 1, wherein:

for each chair of the plurality of chairs, lower edges of the lateral openings are substantially aligned with an internal lower surface of the base body, the internal lower surface defining a bottom of the interior volume; and when a first chair of the plurality of chairs is connected to the mounting surface adjacent to a second chair of the plurality of chairs:

a first interior volume of the first chair communicates with a second interior volume of the second chair, and a first internal lower surface of the first chair is substantially aligned with a second internal lower surface of the second chair to form an extended receiving surface and an extended receiving volume through the first chair and the second chair.

11. A chair for selectively connecting to a mounting surface, the chair comprising:

a base including:

a base body, an interior volume formed by the base body, two lateral openings formed in opposite lateral sides of the base body, the two lateral openings communicating with the interior volume, each lateral opening occupying at least a majority of an area of a corresponding lateral side of the base, and a top opening formed in a top side of the base body, the top opening communicating with the interior volume;

a connector connected to the base, the connector being configured for selectively connecting the base to the mounting surface; and a seat portion connected to the top side of the base body, the seat portion being selectively moveable between at least an open position and a closed position, the seat portion being arranged:

to provide a seating surface and to prevent access to the top opening when in the closed position, and to allow access to the top opening when in the open position.

12. The chair of claim 11, wherein the seat portion is sized and arranged to provide seating for a single user.

13. The chair of claim 11, wherein the seat portion is selectively moveable between at least the open position and the closed position by pivoting about a pivot axis.

14. The chair of claim 13, wherein the pivot axis is aligned with a front side of the base, a rear edge of the seat portion rotating upward and forward when the seat portion is pivoted from the closed position to the open position.

15. The chair of claim 11, wherein:

the seat portion includes at least one curved protrusion extending downward and forward from a forward portion of a bottom surface of the seat portion; and the base body includes at least one curved recess arranged to receive the at least one curved protrusion therein when the seat portion is in the closed position.

16. The chair of claim 15, wherein:

the seat portion includes at least one post extending downward from a rear portion of the bottom surface of the seat portion;

the base includes at least one opening defined by the base body; and when the seat portion is in the closed position, the at least one post is received and selectively held in the at least one opening.

17. The chair of claim 16, wherein the base further includes at least one rubber grommet disposed in the at least one opening, the at least one rubber grommet being configured to selectively maintain the at least one post in the at least one opening when the seat portion is in the closed position.

18. The chair of claim 11, wherein the seat portion is selectively removable from the base.

19. The chair of claim 11, wherein a front side of the base is closed by the base body such that the interior volume of the base is not accessible from the front side of the base.

20. A modular seating assembly comprising:

a plurality of chairs configured to be selectively connected to a mounting surface in a plurality of positions, each chair of the plurality of chairs comprising:

a base including:

a base body, an interior volume formed by the base body, two lateral openings formed in opposite lateral sides of the base body, the two lateral openings communicating with the interior volume, each lateral opening occupying at least a majority of an area of a corresponding lateral side of the base body, and a top opening formed in a top side of the base body, the top opening communicating with the interior volume;

a connector connected at least in part to a bottom side of the base body, the connector being configured for connecting to the mounting surface; and a seat portion connected to the top side of the base body, the seat portion being selectively moveable between at least an open position and a closed position, the seat portion being arranged:

to provide a seating surface and to prevent access to the top opening when in the closed position, and to allow access to the top opening when in the open position, when a first chair of the plurality of chairs is connected to the mounting surface adjacent to a second chair of the plurality of chairs:

a first lateral opening of the two lateral openings of the first chair is adjacent to a second lateral opening of the two lateral openings of the second chair; and a first interior volume of the first chair communicates with a second interior volume of the second chair through adjacently disposed first lateral opening and second lateral opening.

21. The assembly of claim 20, wherein:

for each chair of the plurality of chairs, lower edges of the lateral openings are substantially aligned with an internal lower surface of the base body, the internal lower surface defining a bottom of the interior volume; and when a first chair of the plurality of chairs is connected to the mounting surface adjacent to a second chair of the plurality of chairs:

a first interior volume of the first chair communicates with a second interior volume of the second chair, and a first internal lower surface of the first chair is substantially aligned with a second internal lower surface of the second chair to form an extended receiving surface and an extended receiving volume through the first chair and the second chair.

* * * * *